March 20, 1951  J. M. VIKEN  2,545,800
FOLDING GOOSE AND DUCK DECOY
Filed June 23, 1947  3 Sheets-Sheet 1
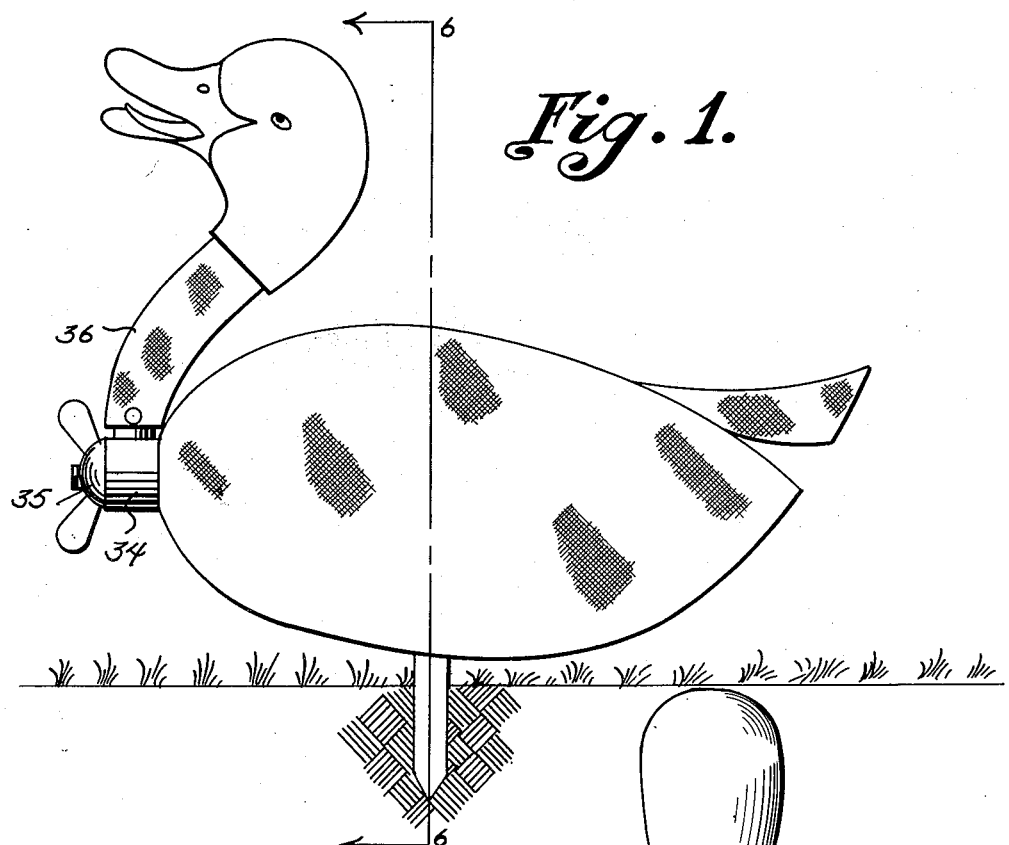
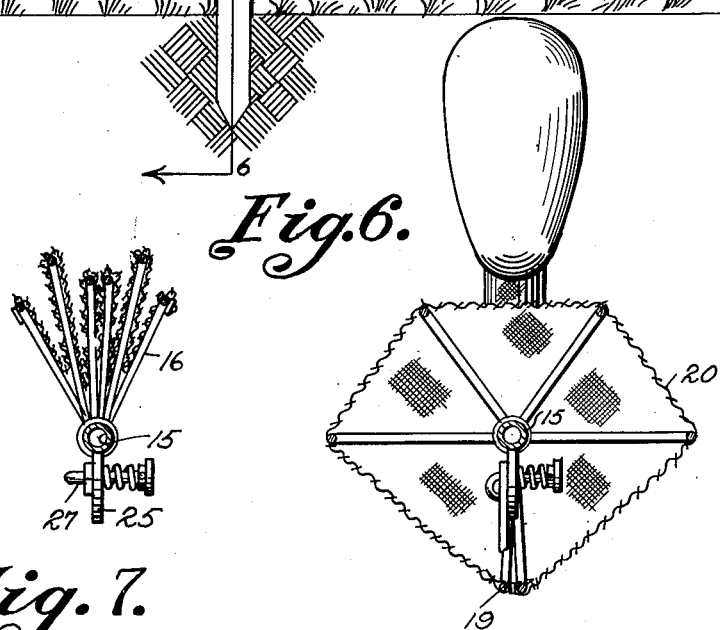
INVENTOR.
John M. Viken
BY Victor J. Evans & Co.
ATTORNEYS March 20, 1951 J. M. VIKEN 2,545,800
FOLDING GOOSE AND DUCK DECOY
Filed June 23, 1947 3 Sheets-Sheet 2
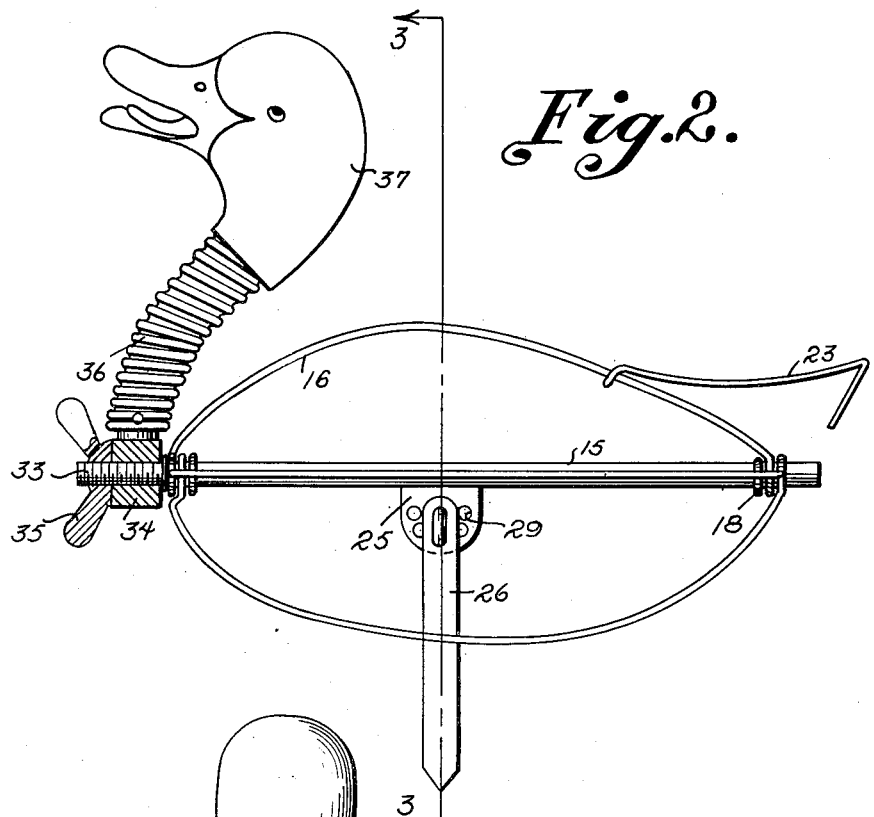
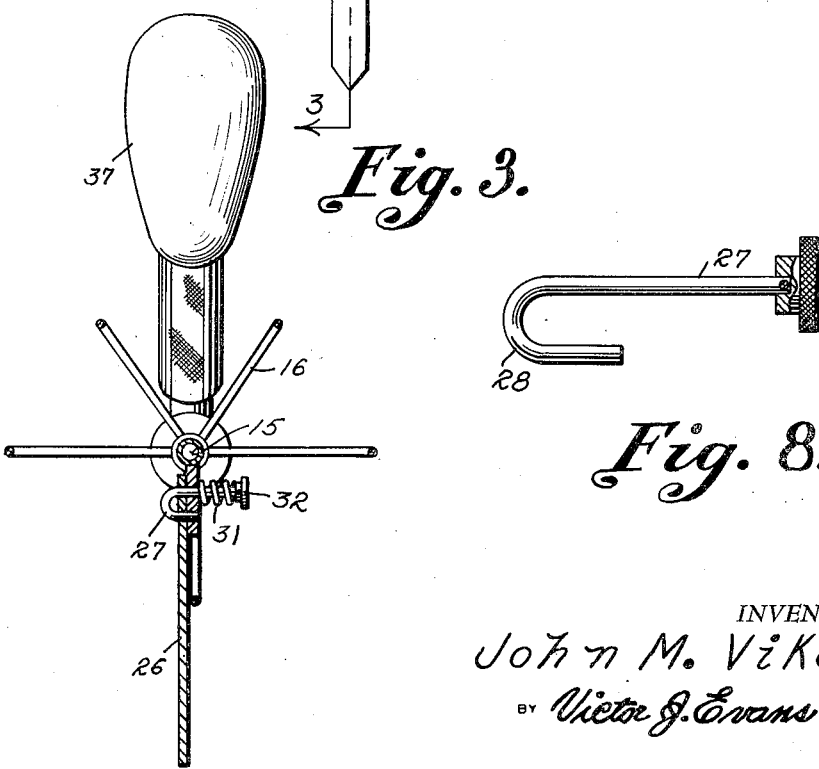
INVENTOR.
John M. Viken
BY Victor J. Evans & Co.
ATTORNEYS

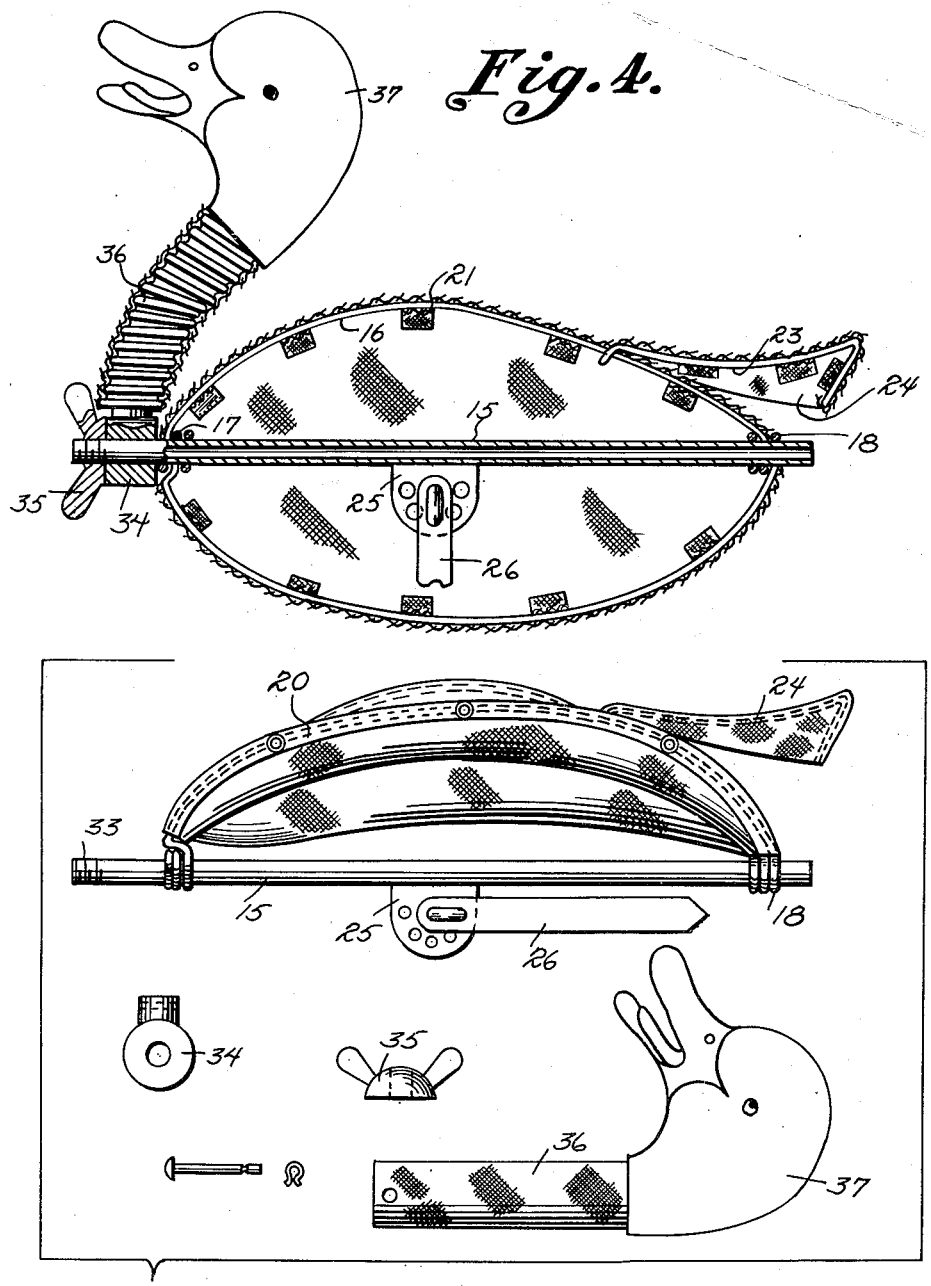

Patented Mar. 20, 1951

2,545,800

UNITED STATES PATENT OFFICE 2,545,800

FOLDING GOOSE AND DUCK DECOY

John M. Viken, Devils Lake, N. Dak.

Application June 23, 1947, Serial No. 756,379

2 Claims. (Cl. 43—3)

1

This invention relates to goose and duck decoys.

It is an object of the present invention to provide a goose or duck decoy which is of less weight and less bulk to carry about than the standard duck decoy.

It is another object of the present invention to provide a goose or duck decoy which is collapsible and can be folded so as to consume little space when carrying the same about and wherein the same can be assembled and opened easily and in a short time.

Other objects of the present invention are to provide a decoy which is of simple construction, inexpensive to manufacture and convenient to use.

For other objects and for a better understanding of the invention, reference may be had to the following detailed description taken in connection with the accompanying drawing, in which Fig. 1 is a side elevational view of the decoy with the post extended and secured to the ground.

Fig. 2 is a side elevational view of the frame parts after they have been moved to an open position with the covering free of the same and showing in section the connection of the neck assembly to the central supporting shaft.

Fig. 3 is a cross-sectional view, in elevation, taken on line 3—3 of Fig. 2.

Fig. 4 is a longitudinal cross-sectional view of my decoy.

Fig. 5 is a collective view of the parts serving to make up the decoy as they are disassembled for packing.

Fig. 6 is a cross-sectional view, in elevation, taken on line 6—6 of Fig. 1.

Fig. 7 is an end elevational view of the body part after the frame elements have been collapsed and folded along the top of the arrangement.

Fig. 8 is a detail elevational view of a securing pin for the supporting post with a portion shown in section.

Referring now to the figures, 15 represents a main supporting shaft on which there is journalled a plurality of wire frame 16. These frames are journalled at their opposite ends as indicated at 17 and 18 and can be pivoted so as to be assembled in a collapsed condition and all at one side of the hollow shaft 15 or can be extended to form the frame of the body of the decoy. A flexible covering is connected to the frame and its ends are connected to the bottom frame as indicated at 19, Fig. 6, and are brought together as the covering is extended from the position shown in Fig. 7 to the position shown in Fig. 6. A further showing of the folded or collapsed covering is in Fig. 5. The covering as indicated at 20 is secured to the respective frames by small gusset strips 21.

2

On the uppermost frame 16 there is connected a tail frame 23 over which a covering 24 is extended.

Secured to the shaft 15 interiorly of the frames 16 and at the center of the shaft 15 is a bracket 25 on which there is pivotally connected a post 26 adapted to extend between the bottom frame for insertion into the ground to support the decoy in an upright position relative thereto. When the frames are collapsed, the support 26 can be pivoted to a horizontal position as shown in Fig. 5. The pivotal connection of the support 26 with the bracket 25 is effected by a pin 27 with a bent portion 28 adapted to be projected through any one of several holes 29 whereby to retain the support in an adjusted position. A spring 31 will react against a button 32 to normally hold the pivot pin 27 within the openings 29.

The forward end of shaft 15 is threaded as indicated at 33. A neck base 34 is extended over the threaded portion of the shaft 15 and is secured thereon against axial displacement by a wing nut 35. On the neck base 34 there is mounted a flexible or bellows-like tube 36 having a goose or duck head of wood secured to the upper end of the same. This head is indicated at 37.

While various changes may be made in the detail construction, it shall be understood that such changes shall be within the spirit and scope of the present invention as defined by the appended claims.

I claim:

1. A collapsible goose or duck decoy comprising a central shaft, frame members pivoted to the central shaft, a covering extended over the frame members and adapted to be extended to form the body of the decoy or to be collapsed or folded for the purpose of being transported, and head means secured to one end of the shaft exteriorly of the frame members.

2. A collapsible decoy as defined in claim 1, and said head means comprising a neck base, a wing nut threadedly connected to the forward end of the shaft to secure the base in place, a flexible neck portion secured to the neck base, and a head on the upper end of the flexible neck portion.

JOHN M. VIKEN.

REFERENCES CITED

The following references are of record in the file of this patent:

UNITED STATES PATENTS

| Number | Name | Date |
|---|---|---|
| 529,463 | Roberts | Nov. 20, 1894 |
| 812,499 | Johnston | Feb. 13, 1906 |